US012578077B2

(12) United States Patent
Waizenegger

(10) Patent No.: US 12,578,077 B2
(45) Date of Patent: Mar. 17, 2026

(54) SIGNALER SEGMENT WITH AN INNER SIDE FOR HOMOGENEOUS OVERALL ILLUMINATION

(71) Applicant: WERMA Holding GmbH + Co. KG, Rietheim-Weilheim (DE)

(72) Inventor: Dietmar Waizenegger, Mühlheim (DE)

(73) Assignee: WERMA Holding GmbH + Co. KG, Rietheim-Weilheim (DE)

( * ) Notice: Subject to any disclaimer, the term of this patent is extended or adjusted under 35 U.S.C. 154(b) by 0 days.

(21) Appl. No.: 18/978,197

(22) Filed: Dec. 12, 2024

(65) Prior Publication Data

US 2025/0198597 A1 Jun. 19, 2025

(51) Int. Cl.

*F21V 7/00* (2006.01)
*F21V 7/04* (2006.01)
*F21V 9/40* (2018.01)
*F21Y 115/10* (2016.01)

(52) U.S. Cl.

CPC .............. *F21V 7/041* (2013.01); *F21V 7/043* (2013.01); *F21V 9/40* (2018.02); *F21Y 2115/10* (2016.08)

(58) Field of Classification Search

CPC ............. F21V 9/40; F21V 7/041; F21V 7/043
See application file for complete search history.

(56) References Cited

U.S. PATENT DOCUMENTS

| | | | |
|---|---|---|---|
| 7,976,185 B2 | 7/2011 | Uang et al. | |
| 9,557,014 B2 | 1/2017 | Shigematsu | |
| 10,030,826 B2 | 7/2018 | Belitz | |
| 10,323,820 B2 | 6/2019 | Shigematsu | |
| 11,781,734 B2 | 10/2023 | Tone et al. | |
| 2011/0122631 A1* | 5/2011 | Becker | F21V 7/09 362/296.01 |
| 2012/0069556 A1* | 3/2012 | Bertram | F21V 7/005 362/217.14 |

(Continued)

FOREIGN PATENT DOCUMENTS

| | | |
|---|---|---|
| EP | 3174021 B1 | 9/2019 |
| JP | 2001210102 A | 8/2001 |

(Continued)

OTHER PUBLICATIONS

Examination Report for German Application No. 102023135286.5, dated Sep. 5, 2024, 6 pages.

(Continued)

*Primary Examiner* — Gerald J Sufleta, II
(74) *Attorney, Agent, or Firm* — Christopher J. Volkmann; KELLY, HOLT & CHRISTENSON PLLC

(57) ABSTRACT

A segment(S) for a visual signaler is proposed, in which the inner side (3) of the lateral face (2) is shaped in such a way in relation to its surface that it has a fluting structure with a sequence of at least two notches (12) in each of the first and second illumination regions (AB1, AB1), wherein the sequence of troughs and peaks alternates along the line of curvature of the lateral face (2) while the troughs and/or peaks are arranged in a straight line parallel to the lateral face (2) and/or substantially perpendicular, preferably completely perpendicular to the line of curvature along the inner side (3) of the lateral face (2). For improved signaling, at least two of the notches (12) in one of the illumination regions (AB1, AB2) have geometrically different designs.

20 Claims, 4 Drawing Sheets

(56) References Cited

U.S. PATENT DOCUMENTS

2020/0408384 A1* 12/2020 Aruga ..................... F21V 5/045

FOREIGN PATENT DOCUMENTS

KR 101256348 B1 4/2013
WO WO2015049751 A1 4/2015

OTHER PUBLICATIONS

Examination Report for German Application No. 102023135286.5, dated Sep. 5, 2024, 12 pages.
EP 24209032.2—European Search report dated Apr. 4, 2025, 22 pages.

* cited by examiner

SIGNALER SEGMENT WITH AN INNER SIDE FOR HOMOGENEOUS OVERALL ILLUMINATION

CROSS-REFERENCE TO RELATED APPLICATION

This Application claims priority to German Application No. 10 2023 135 286.5, filed Dec. 15, 2023, the content of which is hereby incorporated by reference in its entirety.

DETAILED DESCRIPTION

Figure 1:
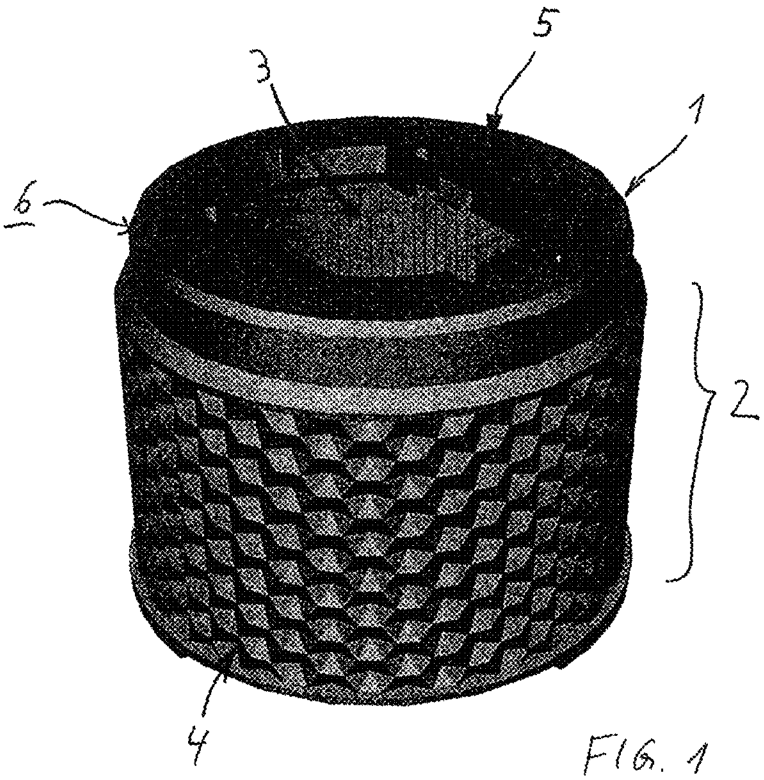
FIGS. 1 and 2 each show perspective views of a diffuser for a segment according to one example.

The present disclosure relates to a segment for a visual signaler.

The prior art has disclosed signalers, for example in the form of signaling columns, which are attached to or on machines (for example production machines, for instance machine tools or the like). They signal an operating state of the machine using visual signals, e.g. a green segment for the regular operating state, orange for a more critical state that needs checking (e.g. should material need refilling soon, should a tool need replacing soon or the like) and red for a fault. Typically, such signaling columns are composed of individual segments that are arranged or stacked over one another. As a rule, the signaling columns have a cylindrical basic shape. In turn, the interior thereof contains a light source, e.g. a light-emitting diode or an arrangement of light-emitting diodes. A fundamental problem on account of the light source being arranged locally at one point in the interior of the diffuser and having only a small emission surface in relation to the area of the viewing window is that when the light source is switched on a bright light spot can be seen where the light source is situated or over the extent of the emission cone, while the surroundings thereof are illuminated but with ever decreasing brightness at distances further out. This is very pronounced in conventional segments from the prior art, with a local luminous spot being all that is visible in the case of some domes with a width of a few centimeters. For this reason, some segments have regular fluting structures on the inner or outer side of the dome or on the outside of the diffuser. However, the described effect is only rectified insufficiently thereby. A problem therewith is that the signal to be emitted by the signaler is sometimes immediately conspicuous or not so clearly recognizable.

A problem addressed by the present disclosure is that of providing a segment which enables particularly clear and pronounced signaling.

Using a segment and a signaler of the aforementioned type as a starting point, the problem is solved by examples discussed herein.

Advantageous embodiments and developments of the present disclosure are possible by way of the example measures discussed herein.

The segment according to one example is a component for a visual signaler. A segment capable of emitting visual signals can usually comprise a transparent dome as a viewing window or housing part, the surface of which usually has a smooth embodiment. However, a diffuser can be used in the interior of the dome. It is also conceivable that dome and diffuser are designed as a common component or as a single component. For example, the diffuser might have a cylindrical basic shape, the lateral face of which consists of material that is transparent in the visible spectral range. In principle, the diffuser need not have an exactly cylindrical design. For example, a conical frustum-shaped basic shape is also conceivable. The dome can likewise have e.g. a cylindrical or conical frustum-shaped design.

As a rule, the transparent region of the diffuser covers a 360° range. However, it is also conceivable that a smaller angular range is encompassed, for example even only 180°.

Furthermore, the segment comprises a reference plane. Typically, a printed circuit board on which the electronics or at least some of the electronics of the visual signaling element, including the light source, are arranged is arranged perpendicular to the base of the diffuser or segment. Hence, such a printed circuit board can extend in the reference plane or parallel therewith, e.g. at a slight offset. The longitudinal axis of the segment which is also perpendicular to the base and arranged in the middle or center thereof can be located in the reference plane.

The visual signaling element can emit from the reference plane. Hence the reference plane divides the space into two sides, with one of the signaling elements being situated on one of the two sides. Overall, the signaling elements can be attached to both sides. The visual signaling element often has its own specific emission angle.

Within the scope of the present disclosure, it was recognized that the side regions adjoining the reference plane generally are illuminated to the least extent because they are located outside of the emission angle and are also only illuminated indirectly, with even this leading to a significantly weaker illumination.

The present disclosure therefore solves the problem of improving signaling so that a more homogeneous overall illumination can be provided. Although fluting on the inner side of the diffuser lateral face can ensure indirect illumination of regions in the diffuser interior, an approximately homogeneous overall illumination in the diffuser interior is only ensured to an insufficient extent thereby. According to the present disclosure, this disadvantage is remedied by virtue of the structure on the inside of the diffuser lateral face being formed inhomogeneously, to be precise such that the hardly illuminated regions are subject to stronger indirect illumination.

The reference plane intersects the lateral face at two opposite points; thus, it comprises a number of secants through the lateral face. If consideration is given to the perpendiculars to the reference plane which each run through the center of the secants, then these separate two illumination regions.

In a segment according to one example, the inner side of the lateral face is shaped in such a way in relation to its surface that it has a fluting structure with a sequence of at least two notches in each of the first and second illumination regions, wherein the sequence of troughs and peaks alternates along the line of curvature of the lateral face while the troughs and/or peaks are arranged in a straight line parallel to the lateral face and/or substantially perpendicular, preferably completely perpendicular to the line of curvature along the inner side of the lateral face.

The line of curvature runs along a normal section, i.e. a section perpendicular to the longitudinal axis which in turn is perpendicular to the base of the geometric body, i.e. the cylinder or conical frustum.

However, a segment according to one example is moreover distinguished in that at least two of the notches in one of the illumination regions have geometrically different designs. This achieves an anisotropic, angle-dependent reflection of the rays incident on the inner side, with the result that not only is the region located e.g. centrally in the emission angle range of the signaling elements apparently illuminated but also the peripheral region is supplied with sufficient light by reflection such that the diffuser in the interior appears uniformly illuminated. It is particularly advantageous for all notches to have geometrically different designs such that a uniform transition of the adapted overall illumination arises between individual regions within the diffuser, i.e. no steps in brightness with regard to the overall illumination are visible from the outside.

Furthermore, an exemplary embodiment is distinguished in that the inner side of the lateral face is shaped in such a way in relation to its surface that for at least some of the light from the signaling element or elements a light beam which consists of parallel light rays emitted from a specific angle and which runs through the first illumination region until the lateral face is reached is reflected at least in part into the first illumination region and at least in part into the second illumination region.

A light beam consisting of a plurality of parallel light rays has a certain width. In this case, consideration is given to e.g. light beams with a width of at least 10 μm, preferably at least 50 μm and particularly preferably at least 100 μm. The measure according to one example results in the light being distributed so broadly within the two illumination regions that the overall illumination can be significantly improved. This is due to the fact that portions of the light capture both illumination regions.

The light beam consisting of parallel rays has a certain width. The inner side of the lateral face on which the light from the beam is incident is aligned such that, as a rule, one portion of a light beam is incident on the differently aligned profile of the surface with a slightly different angle of incidence to another portion which is incident on the profile slightly thereto. One portion of the light beam is reflected into a different illumination region than the other portion.

Advantageously, this is rendered possible for both single-row and multi-row arrangements of signaling elements. For example, one or more signaling elements can be arranged in the middle between the lateral walls. Furthermore, signaling elements can also be arranged, in particular symmetrically arranged, between the lateral surfaces in the reference plane on both sides of the middle. The different rows are then e.g. respectively arranged in different illumination regions.

The inner side of the lateral face can also have edges and hence abrupt transitions between the differently aligned partial regions in this case. In such an embodiment, the changes between differently aligned surfaces can occur more frequently and with a greater density than in the case of smooth transitions between the surfaces. Moreover, manufacture is generally simpler, i.e. the production costs might also be lower.

When a ray emanating from the center or from the longitudinal axis of the diffuser is incident on a smooth, cylindrical lateral surface, it would be incident on the surface at right angles and would ideally be retroreflected. Should the diffuser have a conical frustum shape, the beam would only experience deflection in or counter to the direction of inclination. In the case of an angle of incidence with a greater absolute value, the beam experiences a stronger deflection laterally within the cross-sectional area of the diffuser in order to improve the overall illumination.

The inner side of the lateral face has a step structure in a development of one example. Each step is composed of an edge with a respective limb extending along its sides. The edges extend substantially parallel to the lateral face or perpendicular to the line of curvature of the lateral face. In the case of a cylindrical shape of the lateral face, they extend parallel to the longitudinal axis. If the area of incidence of a light beam includes the edge, then the said light beam can thus be reflected into one spatial direction, i.e. into one of the two illumination regions, off the one limb and into a different illumination region off the other limb. This can improve the overall illumination.

As already stated, the edge can also be rounded off. As a result, the light rays can be deflected over a continuous angular range at the transition, and this can also make a contribution to a more homogeneous overall illumination.

The limbs have different embodiments in a particularly preferred embodiment variant. They can have different lengths and/or be inclined at different angles. As a rule, the length of the limbs influences the proportion of light reflected in a specific direction. The different inclinations influence the light distribution in space.

If the limbs become monotonically longer to one side of the substantially parallel edges, then an ever increasing light proportion is deflected into the region in the direction of which the limbs are also becoming ever longer. For example, if the assumption is made that there is a smaller overall illumination in the peripheral regions directly adjacent to the reference plane purely as a result of the emission from the signaling elements, then a greater proportion of the reflected light can reach this region for the purpose of a more homogeneous overall illumination.

Accordingly, the surface alignments, i.e. their angular positions in relation to the respective incident rays, can also vary, and so the angle of incidence in particular increases or decreases in one direction along the lateral surface. In one exemplary embodiment, the steps can be designed such that the rays are deflected differently depending on whether they are incident on the one side or the other side of the edge of a step on the lateral surface. The alignments of the limb surfaces can be chosen such that some of the rays reach the respective other illumination region from which they do not originate approximately perpendicularly or within a certain angular range around the perpendicular to the reference plane, with the result that intense beams can also reach the hardly illuminated peripheral regions. This improves the homogeneity of the overall illumination. To prevent a significantly brighter spot arising in the region of the main emission angle, the central rays that extend substantially perpendicular to the reference plane in particular should be deflected more strongly than those rays running through the peripheral regions in any case.

The respective illumination regions of the inner sides of the lateral face can have a mirror symmetric embodiment in relation to the perpendicular bisector. This configuration is advantageous in particular if the emission region of the signaling elements on both sides of the perpendicular bisector also has a mirror symmetric design.

If a step is situated exactly in the transition region between the two illumination regions, this step can be formed axis symmetrically with limbs of equal length and equal orientation, wherein the perpendicular bisectors correspond to the axis of symmetry thereof.

In principle, the symmetry of these exemplary embodiments serves to provide more uniform overall illumination within the segment.

The illumination regions in which the inner sides of the lateral face have a particular design as a result of a corresponding profile, for instance the arrangement of steps for a more uniform overall illumination of the interior volume of the segment, can cover different angular ranges depending on the embodiment, in particular depending on emission angles of the signaling element or signaling elements, in particular angular ranges of at least 60°, preferably at least 80° and particularly preferably at least 90°, with the angular dimension specified last meaning that the entire region of the inner side is covered with a profile in each case. Should the emission angle of the signaling element or of the signaling elements be large enough, the angular range in which the inner side has the profile, or the steps can also be adapted accordingly.

Advantageously, the optical medium or the diffuser can be manufactured from plastics. This enables cost-effective and precise mass production using an injection molding method. The plastic can then be transparent in the visible wavelength range so that the light is perceivable as a visual signal. Moreover, plastic is a relatively light material, and so the signaling equipment does not cause problems on account of excessive weight.

The lateral face or its inner side can be subdivided into portions. In the case of a reference plane, for example two portions or illumination regions can be arranged on each side of the reference plane, with the illumination regions being separated from one another in each case by the perpendicular bisector. Thus, four portions or illumination regions are distributed over the diffuser in this case, and each one covers 90° at most. In relation to the reference surface, these illumination regions can in turn have a mirror symmetric embodiment. This embodiment is recommended especially if signaling elements which emit in the same or similar fashion are in each case arranged on both sides of the reference plane; this is because the optical appearance or the overall illumination on both sides of the reference plane is similar or the same as a result thereof.

Consideration should be given to the fact that the segment can usually be observed from in principle any direction, i.e. it is advantageous if the visual appearance of the segment (in the luminous and non-luminous state) is virtually angle independent.

A monotonically increasing behavior is present if a quantity, for instance in a manner dependent on its position or angular position, becomes ever larger in one direction or at least remains the same from one position within a sequence to the next. In the case of a strictly monotonically increasing behavior, the quantity becomes larger every time and does not remain at a constant value even once in between. The converse is true in the case of a (strictly) monotonically decreasing behavior.

In one embodiment variant, the height of the steps can also become monotonically lower, in particular strictly monotonically lower. As a result, the steps can have a continuously more obtuse-angled design. Thus, rays are deflected more strongly in one region than in the adjoining regions that approximate a smooth extension of the inner side to an ever-greater extent.

The outside of the lateral face can have a profile with a design such that the emission is implemented as broadly as possible, with the result that the segment emits ever more uniformly and appears to shine uniformly from the outside. Since an emission to the outside in all spatial directions is actually desirable, the structure can also have faces on the outside that are aligned in all 3 spatial directions. To achieve approximately uniform emission, use can be made of for example honeycomb-like structures, especially with troughs and/or peaks. These structures can be arranged on the outside of the diffuser, but for example also on the inside of the dome. In a development, the segment is embodied as a beacon and acts as a termination element, for example. The diffuser comprises a roof, which can be e.g. arched, seated on the lateral face. In this case, too, such structures that diffusely distribute the emitted light can be impressed into the outside of the roof.

Optionally, the reference plane is not only a mathematical plane per se; specifically, a carrier, in particular a printed circuit board, on which the signaling element or the signaling elements are arranged can instead be arranged in the reference plane. This geometric arrangement once again amplifies the necessity to divide the diffuser into portions or illumination regions. The printed circuit board itself represents a visually substantially opaque region, i.e. an optical barrier that divides the segment into two halves. In principle, the printed circuit board can extend from one periphery of the diffuser to the other, but it can also leave a respective gap open on one side or on both sides. Should a gap be left open, the emitted light can also be guided from one side of the reference plane to the other side of the reference plane. Should the printed circuit board reach the lateral face of the diffuser, the shadow due to the printed circuit board at this point is generally clearly visible from the outside; therefore, a gap is still advantageously present.

As already stated, the assumption can be made that the signaling elements emit away from the reference plane or printed circuit board within a certain emission angle range. Thus, so as to achieve a more homogeneous overall illumination in the diffuser interior, it is advantageous as a matter of principle to deflect the beams tending to run perpendicular to the reference plane to a greater extent than in peripheral regions, into which less light tends to be radiated in any case and into which light rays tend to have to be steered.

Thus, the limbs that face the printed circuit board in the sequence of steps can therefore become ever shorter, and the limbs that face away can become ever longer, wherein advantageously the height of the steps reduces ever more, and so the beams that reach the peripheral regions are also reflected back to an ever-greater extent without broad scattering in space.

Furthermore, a signaler according to one example with a homogeneous overall illumination or emission is distinguished in that use is made of a segment according to one example, in order to distribute the emitted light more uniformly. Such a signaler can use the advantages of the present disclosure that accompany the proposed segment.

Figure 2:
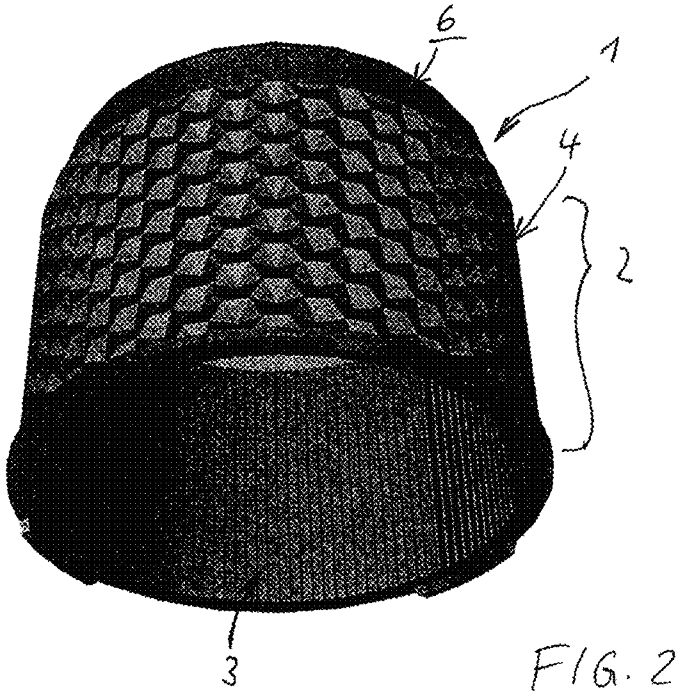

FIGS. 1 and 2 show a diffuser 1 as part of a segment S of a visual signaler. The diffuser 1 is configured in one piece as a plastic injection molded part. The plastic forms the optical medium: It has a design transparent to light. In this case, the diffuser 1 has a substantially cylindrical design. It comprises a lateral face 2, the envelope or basic shape of which is also cylindrical, with an inner side 3 and an outer side 4.

As evident from FIG. 1, the diffuser 1 is terminated on one side by a termination face 5 that is interrupted in the middle. This termination face 5 can be used for assembly of e.g. printed circuit boards, for through-contacting from segment to segment, for mechanically connecting two adjacent segments, for optical isolation between two segment such that as little light as possible, or no light at all, radiates from one segment to the next, or similar purposes. The diffuser 1 is terminated by a base 6, which is fitted thereon as a cylindrical body with a smaller diameter. Termination face 5 is situated on this base 6.

The lateral face 2 has an outer side 4 with a honeycomb pattern formed of troughs. In general, light is emitted more uniformly as a result. The lateral face inner side 3 is provided with a step-shaped profile. It can be seen more clearly in FIG. 2, which shows an oblique view from below. The edges between the steps extend parallel to the lateral face inner side 3 or parallel to the longitudinal axis of the cylindrical segment 1.

Figure 3:
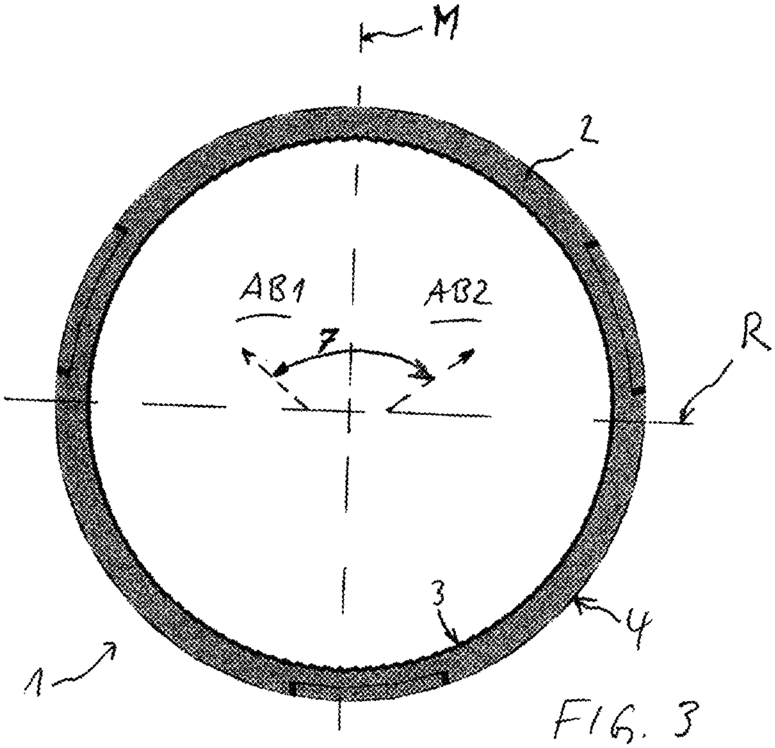
FIGS. 3 and 4 show the corresponding views of the diffuser from FIGS. 1 and 2, in a sectional view in FIG. 3 and from below in FIG. 4.

FIG. 3 shows a sectional illustration through the lateral face 2. The lateral face inner side 3 has a step-shaped or sawtooth-like profile. Two axes R and M are plotted. The one axis labels the reference plane R, and the other axis M extends as perpendicular bisector M between the two points of intersection where the axis R intersects the lateral face inner side 3. The quadrant of FIG. 1 situated to the left of the perpendicular bisector M is referred to as first illumination region AB1, while the right, adjacent quadrant on the other side of the perpendicular bisector M is referred to as second illumination region AB2.

Around the central point, two rays including an angular range 7 extend away from the reference plane R. Within this region, a signaling element emitting into the angular range 7 is arranged in the reference plane R.

A step with two limbs to the right and left of the perpendicular bisector M is situated at the point where the perpendicular bisector M intersects the inner side 3. This step has a symmetric embodiment with respect to the perpendicular bisector M as an axis. For example, if the inner side 3 is followed to the left in the first illumination region AB1, the right limbs become ever longer and are arranged ever flatter from step to step, whereas the left limbs become ever shorter and steeper. Likewise, the heights of the steps become ever lower in the direction of the reference plane R. The inner side 3 appears to have a virtually smooth periphery in the region of the reference plane R.

However, it is also conceivable that the length of the limbs only changes on one side (e.g. only to the right or only to the left of the respective edge) from step to step and remains the same on the other side.

Figure 4:
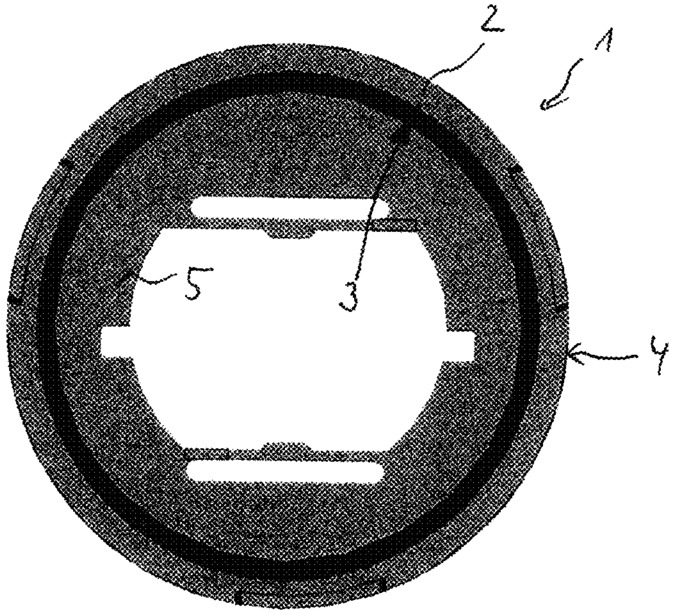

FIG. 4 only shows a view of the diffuser 1 perpendicular from below, i.e. it is possible to identify the circumferential lateral face 2 and the view from below of the termination face 5.

Figure 5:
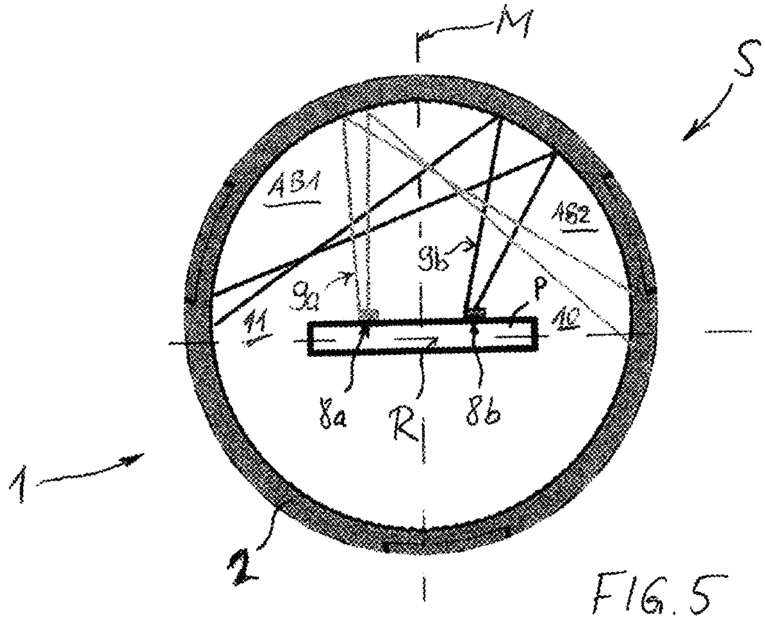
FIG. 5 shows the view of FIG. 3 but with a drawn printed circuit board, signaling elements arranged thereon and a schematically depicted beam path.

In principle, FIG. 5 shows the same view as FIG. 3. A printed circuit board P with two signaling elements (LEDs) 8*a*, 8*b*, i.e. in two-row form, is depicted in the reference plane R. The signaling elements 8*a*, 8*b* send out light within a certain emission angle. Individual light rays 9*a*, 9*b* from the respective signaling element 8*a*, 8*b* have been picked out by way of example here. Even though the rays 9*a* run almost perpendicular to the reference plane R, they are reflected very far into the region 10 in the lateral periphery of the printed circuit board P as a result of the step structure on the inner side 3. As expected, the region in the vicinity of the perpendicular bisector M is illuminated very brightly on account of the arrangement of the signaling elements 8*a*, 8*b* and the emission angle and since a high ray density is prevalent there. If many rays from precisely this region are reflected in the direction of the peripheral regions 10, 11, the overall illumination thereof increases ever more. Hence, the overall illumination in the regions 10, 11 can achieve similar levels of brightness. A more homogeneous overall illumination in the interior of the diffuser 1 is obtained as a result.

Figure 6:
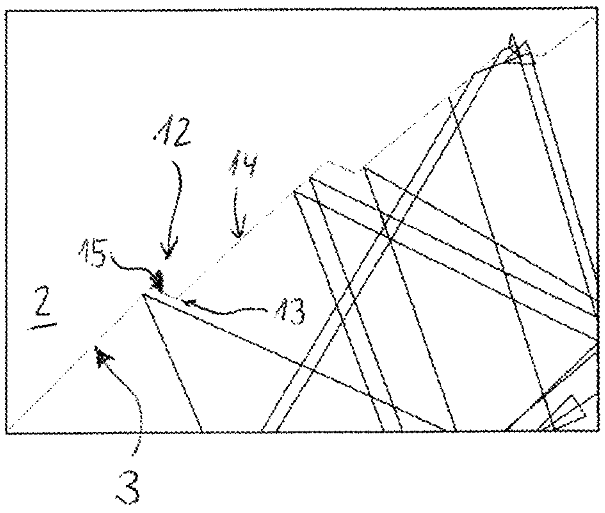
FIG. 6 an enlarged illustration of the steps on the inner side of the lateral face.

FIG. 6 shows an enlarged view of the inner side 3 of the optical medium or lateral face 2. A section of the step structure or profile is visible here. The steps 12 have an edge 13 and two limbs 14, 15. The right limb 14 is significantly longer than the left limb 15, but the latter has a steeper work angle than the limb 14 over the extent of the lateral face 2. Hence, light rays can be reflected very far to the right into the region 10 or the region 11. A relatively wide beam of light rays incident around the edge 13 can thus reach two illumination regions AB1, AB2.

Figure 7:
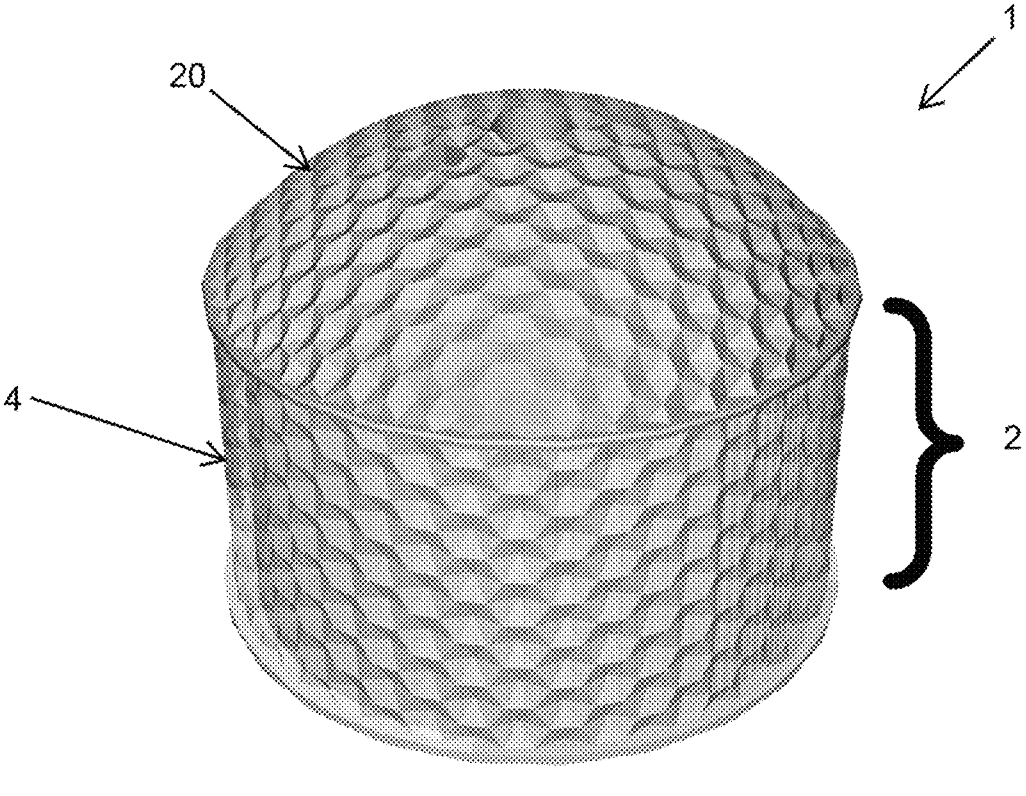
FIG. 7 shows a perspective view of a diffuser for a single termination unit (beacon).

FIG. 7 shows a development in the form of a so-called beacon. Only the diffuser 1 is depicted. The latter is used as a termination element on a signal column and also emits upwardly. Hence, it is not only the outer side 4 of the lateral face 2 that is provided with a honeycomb-like structure, but also the roof 20 which is arched like a dome. In principle, it is also conceivable that the inner side of the roof 20 is provided with a groove pattern or with a step structure. However, as a rule, the printed circuit boards with the luminous elements are perpendicular to the base, and the roof 20 is located only in the lateral region of the luminous element. Therefore, the inner side has a smooth embodiment in the region of the roof 20.

Although the present invention has been described with reference to preferred embodiments, workers skilled in the art will recognize that changes may be made in form and detail without departing from the spirit and scope of the invention.

LIST OF REFERENCE SIGNS

1 Diffuser
2 Lateral face/optical medium
3 Inner side
4 Outer side
5 Termination face
6 Base
7 Emission angle
8*a* Signaling element
8*b* Signaling element
9*a* Light rays
9*b* Light rays
10 Peripheral region
11 Peripheral region
12 Step
13 Edge
14 Limb
15 Limb
20 Roof
AB1 Illumination region
AB2 Illumination region
M Perpendicular bisector
P Printed circuit board
R Reference plane
S Segment

The invention claimed is:

1. A segment for a visual signaler comprising:

a diffuser for transmitting visible light and for homogenizing a light distribution in a volume bounded by the diffuser, the diffuser comprising a light-transmissive lateral face in the visible range made of an optical medium and enclosing a cylindrical or conical frustum-shaped volume, having a reference plane in which at least one visual signaling element is configured to emit light toward the optical medium, the reference plane extending in a perpendicular to a base of the cylindrical or conical frustum-shaped volume, wherein the perpendicular bisectors of the secants through the lateral face within the reference plane categorize a volume on at least one side of the reference plane into a first illumination region and a second illumination region, wherein an inner side of the lateral face is shaped in such a way in relation to a surface of the inner side that it has a fluting structure with a sequence of a plurality of notches in each of the first and second illumination regions, wherein the sequence of a plurality of notches comprises troughs and peaks that alternate along a line of curvature of the lateral face while at least one of the troughs or peaks is arranged in a straight line parallel to the lateral face and/or substantially perpendicular, wherein at least two notches, of the plurality of notches, in one of the illumination regions have geometrically different designs, wherein the inner side of the lateral face has a step structure with a sequence of at least two steps as notches, wherein each step, of the at least two steps, is delimited by at least two limbs that meet at an edge in each case, wherein the edges are arranged in a straight line parallel to the lateral face and/or substantially perpendicular, and wherein the steps in the respective illumination region are designed in such a way that from a first step to a second step the at least two limbs that delimit the first step and the second step in the corresponding illumination region become monotonically longer or shorter.

2. The segment of claim 1, wherein a ray emanating from a central point of one of the secants through the lateral face within the reference plane, has in terms of absolute value a greater angle of incidence at the point of incidence on the lateral face than in an event of a tangential alignment of the surroundings of the point of incidence on the lateral face inner side vis-à-vis the line of curvature along the inner side of the lateral face.

3. The segment of claim 1, wherein the inner side of the lateral face has a rounded-off step structure with a sequence of at least two steps, wherein each step is delimited by two limbs that meet at a rounded-off edge.

4. The segment of claim 1, wherein with respect to the perpendicular bisectors of the secants through the lateral face and in relation to the step structure, the inner side of the lateral face in the first illumination region is designed to be mirror symmetric with respect to the inner side of the lateral face in the second illumination region, at least one of the steps is located on a boundary between the first illumination region and the second illumination region such that a first limb, of the at least two limbs, is located in the first illumination region and a second limb, of the at least two limbs, is located in the second illumination region, the lateral face comprises a ring-shaped lateral face, and the inner sides of the illumination regions of the ring-shaped lateral face are arranged mirror-symmetrically with respect to the reference plane.

5. The segment of claim 4, wherein at least one of the illumination regions covers a shape of the inner side.

6. The segment of claim 1, wherein the optical medium comprises a plastic that is transparent in the visible wavelength range.

7. The segment of claim 1, wherein a height of the steps in at least one of the illumination regions becomes monotonically lower wherein the height of the steps is the radial distance of the respective edge from the envelope of the points of contact of the respective adjacent steps.

8. The segment of claim 1, wherein the lateral face and/or the optical medium is provided with a regular structure on its outside.

9. The segment of claim 1, wherein the at least one visual signaling element is arranged on a printed circuit board in the reference plane, wherein the printed circuit board:

separates the first and second illumination regions from the remaining volume, and/or at edges of the printed circuit board on at least one side-leaves open a gap to the inner side of the lateral face and/or wherein the inner side of the lateral face is shaped such that portions of the light beam are steered through the gap by reflection.

10. The segment of claim 9, wherein the printed circuit board is arranged such that:

the limbs becoming shorter from step to step face the printed circuit board, and/or the limbs becoming longer from step to stepface away from the printed circuit board, and/or in at least one of the illumination regions the height of the steps becomes monotonically lower-from step to step the closer the corresponding step is located to the printed circuit board.

11. The segment of claim 1, wherein the troughs and/or peaks are arranged completely perpendicular to the line of curvature along the inner side of the lateral face.

12. The segment of claim 1, wherein the edges are arranged completely perpendicular to the line of curvature along the inner side of the lateral face.

13. The segment of claim 1, wherein the limbs that delimit the first step and the second step become strictly monotonically longer or shorter, toward one of the two sides of the edge.

14. The segment of claim 5, wherein all illumination regions cover a shape of a step structure over an angular range of at least 60°.

15. The segment of claim 2, wherein the ray emanates from the center of the cylindrical or conical frustum-shaped volume or emanating from the central point of a cross-sectional area of the cylindrical or conical frustum-shaped volume.

16. A segment for a visual signaler comprising:

a diffuser for transmitting visible light and for homogenizing a light distribution in a volume bounded by the diffuser, the diffuser comprising a light-transmissive lateral face in the visible range made of an optical medium and enclosing a cylindrical or conical frustum-shaped volume, having a reference plane in which at least one visual signaling element is configured to emit light toward the optical medium, the reference plane extending in a perpendicular to a base of the cylindrical or conical frustum-shaped volume, wherein the perpendicular bisectors of the secants through the lateral face within the reference plane categorize a volume on at least one side of the reference plane into a first illumination region and a second illumination region, wherein an inner side of the lateral face is shaped in such a way in relation to a surface of the inner side that it has a fluting structure with a sequence of a plurality of notches in each of the first and second illumination regions, wherein the sequence of a plurality of notches comprises troughs and peaks that alternate along a line of curvature of the lateral face while at least one of the troughs or peaks is arranged in a straight line parallel to the lateral face and/or substantially perpendicular, wherein at least two notches, of the plurality of notches, in one of the illumination regions have geometrically different designs, and wherein the inner side of the lateral face is shaped in such a way in relation to its surface that for at least some of the light from the at least one visual signaling element a light beam which consists of parallel light rays emitted at a specific angle and which runs through the first illumination region until the lateral face is reached is reflected at least in part into the first illumination region and at least in part into the second illumination region.

17. The segment of claim 16, wherein the light beam has a diameter of at least 10 μm.

18. The segment of claim 17, wherein the light beam has a diameter of at least 50 μm.

19. The segment of claim 17, wherein the light beam has a diameter of at least 100 μm.

20. A segment for a visual signaler comprising:

a diffuser for transmitting visible light and for homogenizing a light distribution in a volume bounded by the diffuser, the diffuser comprising a light-transmissive lateral face in the visible range made of an optical medium and enclosing a cylindrical or conical frustum-shaped volume, having a reference plane in which at least one visual signaling element is configured to emit light toward the optical medium, the reference plane extending in a perpendicular to a base of the cylindrical or conical frustum-shaped volume, wherein the perpendicular bisectors of the secants through the lateral face within the reference plane categorize a volume on at least one side of the reference plane into a first illumination region and a second illumination region, wherein an inner side of the lateral face is shaped in such a way in relation to a surface of the inner side that it has a fluting structure with a sequence of a plurality of notches in each of the first and second illumination regions, wherein the sequence of a plurality of notches comprises troughs and peaks that alternate along a line of curvature of the lateral face while at least one of the troughs or peaks is arranged in a straight line parallel to the lateral face and/or substantially perpendicular, and wherein all notches, of the plurality of notches, in one of the illumination regions have geometrically different designs.

* * * * *